United States Patent Office 3,354,169
Patented Nov. 21, 1967

3,354,169
LATEX MODIFIED CEMENT MORTAR COATING COMPOSITIONS AND METHOD OF COATING
Harvey H. Shafer and Laverne C. Wheeler, Midland, Mich., assignors to The Dow Chemical Company, Midland, Mich., a corporation of Delaware
No Drawing. Filed Dec. 31, 1964, Ser. No. 422,524
13 Claims. (Cl. 260—29.7)

This invention relates to novel latex modified Portland cement mortar coating compositions and to a method of coating. More particularly it relates to Portland cement mortar compositions characterized by containing a copolymer of styrene and butadiene-1,3 and minor amounts of asbestos fiber dispersed in water with certain minor amounts of non-ionic and anionic surfactants and a foam depressant.

Pipes used for drainage and particularly those used for underground drainage, are currently prepared from rigid Portland cement concrete or from comparatively flexible corrugated metal. Concrete pipe suffers, however, from its lack of inherent flexibility which, when used as underground drainage pipe, requires a rather elaborate bed formation to prevent undue stress and/or strain upon the pipe structure. Corrugated metal pipe is preferred in this respect due to its greater flexibility. Disadvantageously, however, the metal surfaces of such pipe structures are often subject to the deleterious effects of corrosion resulting from the action of acids and/or alkalies in the soil or in materials, such as oil and the like immediately surrounding or passing through the pipe. As a result, such metal surfaces must be provided with a protective coating.

Heretofore, in this regard, use has been made of galvanization of the metal surfaces and/or application of protective coatings of asphalt or an unmodified Portland cement. It has been found, however, that such prior known coatings are insufficiently durable when subjected to the erosive effects of granular materials such as sand or gravel. Further, the adhesion of asphaltic materials to metal surfaces is not reliably positive and, in addition, such coatings are flammable and subject to oxidation. Still further, the prior known coatings of Portland cement are not sufficiently flexible to be retained effectively on the surfaces of corrugated metal pipe and, in addition, are insufficiently durable even when used to coat the surfaces of the more rigid concrete pipes. Still further, prior known cement coating compositions are at best difficulty applied to provide continuous, essentially smooth surfaces by conventional spin lining or spraying techniques.

It is therefore, an obect of this invention to provide improved latex modified cement mortar coatings which are particularly adapted for applying continuous, smooth, and highly durable protective coatings to solid surfaces such as metal and concrete.

It is a further obect to provide a method for applying such coatings to the interior and/or exterior surfaces of such articles as corrugated metal or Portland cement concrete pipes and the like.

Other objects and advantages will become apparent from the following description of the invention.

The above and related obects are attained by use of a latex modified cement mortar coating composition comprising a mixture of; Portland cement, from about 200 to 400 percent based on the weight of cement of a mineral aggregate having a particle size of from about 75 to 250 microns, from about 3 percent to about 20 percent based on the weight of cement of an asbestos fiber filler, from about 20 to about 40 percent based on the weight of cement of a sytrene-butadiene-1,3 copolymer having a styrene: butadiene weight ratio of 30:70 to 70:30, water in amount of at least about 45 percent based on the weight of cement and preferably between about 45 and about 65 weight percent and, based on the weight of copolymer, (a) from about 2 to about 10 percent of non-ionic surfactant, (b) from about 1 to about 7.5 percent of anionic surfactant, at least about 15 percent of which is a sodium higher alkyl (i.e., at least nine carbon atoms and preferably from 9 to about 17 carbons atoms) sulfate, and (c) from about 0.25 to about 0.8 percent of a polyorganosiloxane foam depressant. Additionally, the amounts of non-ionic surfactant, (a) and anionic surfactant, (b) are regulated so that their sum, or total amount, is not more than about 11 percent by weight of the styrene-butadiene copolymer and the ratio of (a) to (b) is about 0.7:1–10:1.

The latex modified cement mortar compositions as herein described, are capable of being sprayed or otherwise easily applied by conventional means to solid surfaces, such as metal and/or concrete, to form continuous, smooth, adherent, long-lived flexible protective coatings which have significantly improved durability, i.e., ability to resist erosion and weathering (including conditions of alternate freezing and thawing) while maintaining a resistance to the corrosive action of alkalies and bases which is provided by conventionally employed cement coatings. These compositions are therefore, especially adapted for coating relatively flexible articles such as the interior and/or exterior of corrugated metal pipes or other metallic articles such as highway guard-rails and the metal portions of bridges and the like. The novel compositions of this invention are also useful for coating various concrete pipes or other solid structures where protection against corrosion and erosion is required. Such coating may also be applied to solid surfaces having conventionally employed adhesives or protective materials previously applied thereto.

The styrene-butadiene-1,3 copolymers employed can be prepared in aqueous emulsion in accordance with known procedures. For example, the styrene and butadiene monomers can be mixed in the proportions corresponding to the composition of the desired copolymer in water containing an emulsifying agent or agents and heated with agitation in the presence of a peroxide catalyst to initiate copolymerization such as described in the U.S. Patent 2,498,712.

The concentration of the copolymer in the cement composition is, however, critical for the obtainment of the desired combination of properties required by the present invention. In this regard, copolymer concentrations less than about 20 percent based on the weight of cement used, do not provide adequate flexibility, abrasion resistance and adherence. Further, copolymer concentrations in excess of about 40 percent based on the weight of cement significantly reduce the compressive strength of the coating composition.

The asbestos fibers employed in the novel compositions of this invention are required to provide adequate flexibility, adherence and sprayability of the coating composition. In general, asbestos fiber shorts having a maximum length of about 1000 microns, such as asbestos of 7–M grade, may be employed for the purpose of the present invention. Further, it has been found that such fibers must be present in amounts of at least about 3 percent and preferably in amounts between about 3 and 20 percent, based on the weight of cement, for obtainment of satisfactory sprayability, flexibility and adherence of the cement compositions when applied as relatively thin protective coatings for the interior or exterior surfaces of corrugated metal or Portland cement concrete pipe, and the like solid articles.

The amount of water employed in preparing the cement mortar compositions of the present invention is also extremely important with regard to providing compositions of desired workability. In this regard at least about 45 percent water, based on the weight of cement, is necessary to provide a cement mortar coating composition which may be easily applied as a spray or as a spin coating to form continuous, smooth, protective coatings upon curing of the same. As discussed above, it has been found that the amount of water required varies proportionally with the amount of asbestos fiber employed. Thus, for compositions containing from about 3 to about 20 percent asbestos fiber, based on the weight of cement, from about 45 to about 65 percent water, also based on the weight of cement, is preferred. Amounts of water in excess of about 65 percent tend to dilute the cement compositions to the extent that application of a smooth, continuous coating is, at best, extremely difficult. Further, utilization of water in amounts exceeding about 65 percent, based on the weight of cement, generally results in excessive, highly undesirable shrinkage of the applied coatings during curing.

Some or all of the non-ionic and anionic surfactants employed in the cement compositions of the invention can be present while effecting copolymerization of the styrene and butadiene. Ordinarily, however, it is preferred to follow the practices used in making styrene-butadiene emulsions for use in preparing latex paints. Thus, some but not necessarily all of the anionic surfactant is introduced to aid in effecting the desired dispersion and emulsification in carrying out the copolymerization of butadiene and styrene, and the non-ionic surfactant is subsequently added to stabilize the resulting polymer dispersion. The polyorganosiloxane foam depressant and such additional quantities of non-ionic surfactant and anionic surfactant, as are required to complete the cement composition, are subsequently introduced.

Illustrative of non-ionic surfactants are, for example: fatty acid esters such as glycerol monostearate, diethyleneglycol laurate, propyleneglycol monostearate, sorbitol monolaurate, and pentaerythritol monostearate; acid derivatives of ethylene oxide products such as the reaction product of six mols of ethylene oxide with one of oleic acid; condensation products of ethylene oxide with alcohols such as stearyl alcohol; and condensation products of ethylene oxide with phenols, naphthols, and alkyl phenols such as di-t-butylphenoxynonaoxyethyleneethanol. Preferred are the condensation products of ethylene oxide with alkyl phenols.

Illustrative of anionic surfactants are, for example: the alkyl aryl sulfonates such as dodecylbenzene sodium sulfonate; sulfate derivatives of higher fatty alcohols (i.e., alcohols of at least nine carbon atoms and ordinarily not more than seventeen carbon atoms) such as sodium lauryl sulfate; the sulfonated animal and vegetable oils such as sulfonated fish and castor oils; sulfonated acyclic hydrocarbons; and the like. As pointed out heretofore, at least 15 percent of the anionic surfactant component of the cement additive of the invention should be a sodium higher alkyl sulfate such as sodium lauryl sulfate and preferably the anionic surfactant component consists of a mixture of an alkyl aryl sulfonate surfactant and such sodium higher alkyl sulfate.

Illustrative of the polyorganosiloxanes are the condensation products resulting from polymerization of organo silane diols, as represented by the formula

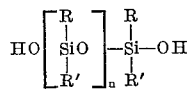

where R and R', in the above formula, represent organic radicals such as alkyl, aryl, aralkyl and alkaryl or heterocyclic groups, and $n$ is one or more. Also useful are polymerization products of organo silane diols in the presence of an organo silane monol, and condensation products obtained from mixtures of organo silane triols, diols, and monols.

Preferably the organo substituent of the siloxanes is lower alkyl (i.e., methyl, ethyl, propyl), cyclohexyl or phenyl. Most preferably it is methyl, and, accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids," "silicone emulsions" and "silicone compounds," the latter being siloxanes modified by the addition of a small percentage of finely divided silica or other inert divided solid. Any of these forms can be used in the practice of this invention.

The term "Portland cement" is used herein to include generally the kind of product obtained by heating limeclay mixtures, or natural cement-rock, to such a temperature that practically the entire product is sintered, followed by grinding. Various additives can be included, of course, in accordance with conventional Portland cement manufacturing practices. It will be understood, of course, that various modifications such as the hydraulic cements of the kind commonly known as calcium-aluminate cements can be used in place of Portland cement as substantial equivalents therefor in the compositions and methods of this invention.

The aggregate employed in the present invention may be any conventionally employed mineral aggregate such as sand and a mixture of sand with gravel, crushed stone or equivalent materials. Further, when compositions having optimum sprayability properties are desired an aggregate having a particle size less than about 250 microns is preferred. Such mineral aggregate is generally advantageously employed in amounts between about 200 and 400 percent, based on the weight of cement, for obtainment of best results.

Cement mortar mixes are made according to the present invention by simply adding the additives of the invention to the cement with mixing to obtain a cement mix of desired flow and working consistency.

While it is generally convenient to prepare the cement mortar composition of the invention as a unitary produce by pre-combining the styrene-butadiene copolymer, non-ionic and anionic surfactant, and polyorganosiloxane foam depressant, and then introducing the resulting mixture into the cement-aggregate mixture in making cement, mortar, or concrete mixes, it will be understood, of course, that it is not necessary that all the various components of the additive be so premixed. For example, equivalent cement, mortar, or concrete mixes are obtained by separate addition of the requisite quantity of styrene-butadiene copolymer emulsion containing sufficient of the anionic and non-ionic surfactants to avoid coagulation of the latex, the polyorganosiloxane foam depressant and such additional non-ionic and anionic surfactants as are necessary.

The following example, wherein all parts and percentages are to be taken by weight, illustrate the present invention but is not to be construed as limiting its scope.

*Example I*

A cement mortar coating composition was prepared by admixing the following ingredients utilizing a procedure essentially as defined by the ASTM designation C–305–55T "Mechanical Mixing of Hydraulic Cement Mortars of Plastic Consistency."

Ingredients: Grams
Portland cement (type II–ASTM C–150–63) __ 100
No. 18 silica sand (177 micron size) _____ 300
Asbestor fiber 7–M (840 microns in length) ___ 3
Polymethylsiloxane (foam depressant) _____ 0.3
Styrene-butadiene latex _____ 30
Water (including water present in latex) _____ 52.5

The styrene-butadiene latex used was composed of an aqueous emulsion of 48 weight percent of a solid copolymer of 66 percent styrene and 34 percent butadiene-1,3; and, based on the copolymer weight, 4.65 percent of the non-ionic surfactant di-t-butylphenoxynonaethyleneethanol; and 0.78 percent of a mixture of anionic surfactants comprising 56 percent of sodium lauryl sulfate and 44 percent of dodecyl-benzene sulfanate. Various physical properties of coated products prepared using the composition of this example are given in Tables II and III hereafter in comparison with several products in which the concentrations of one or more of the composition ingredients are changed.

The composition of the cement mortar compositions used for comparison with the product of this example are illustrated in Table I below. They are identified as comparative products "A" and "B" respectively. The comparative composition "A" is a standard non-latex modified Portland cement mortar composition. The comparative product "B" corresponds in composition to the product of this example with the exception that only 10 percent of latex is employed, based on the weight of cement. It will further be noted that larger amounts of water are used in the comparative product "B" to provide a mix of comparable consistency.

TABLE I

|  | Comparative Products | |
| --- | --- | --- |
|  | A | B |
| Portland Cement | 740 grams (Type I, ASTM C-150-63). | 100 grams (Type III, ASTM C-150-63). |
| Sand | 2,035 grams (Standard Ottawa-596 micron). | 300 grams (No. 18 silica, 177 micron). |
| Asbestos fiber | | 3 grams (7-M, 840 micron). |
| Polymethylsiloxane | | 0.3 gram. |
| Styrene-butadiene latex. | | 10 grams. |
| Water | 360 grams | 86 grams. |
| Miscellaneous | 15.8 grams CaCl₂ | |

Table II comparatively illustrates the abrasion resistance of the product of this example and the comparative product "A."

Abrasion resistance was determined using a procedure based on that described in the ASTM Test No. C-241-51 "Abrasion Resistance of Stone Subjected to Foot Traffic." In such test a ⅛ inch layer of a cement mortar coating composition, as herein disclosed, was applied to a major surface of each of three, black iron panels having a thickness of about 0.049 inch. The coatings were then allowed to cure and the coated surface of each panel subjected to abrasion by rotating the same on a metal platform having a No. 60 Alundum abrasive thereon, through a prescribed number of revolutions. The total number of grams of cement coating removed by such abrasion was then calculated by weight difference and is reported herein as the number of grams of coating removed from a total of 12 square inches of coating surface per the designated number of revolutions. Thus, the lower the value, the better the abrasion resistance.

TABLE II

| Abrasion Resistance, No. of Revolutions | Product of Example | Comparative Product A |
| --- | --- | --- |
| 100 | 1.69 | 2.50 |
| 300 | 4.92 | 11.36 |
| 400 | 6.65 | 15.57 |
| 600 | 10.23 | 23.74 |
| 800 | 16.61 | 31.37 |

It will be seen from the data in Table II that the described product of the present invention has greatly improved resistance to abrasion over that of the comparative Portland cement coated product.

Table III comparatively illustrates the adhesion, flexibility, durability and sprayability of the product of this example and the comparative product "B."

Adhesion and flexibility were determined essentially as described by the ASTM Test D-1167-58T, paragraph 13. In such test a ⅛ inch thick continuous coating of a cement mortar coating composition was applied to a major surface of a 4-inch by 12-inch black iron or galvanized iron panel having a thickness of about 0.049 inch, and allowed to cure. The coated panel was then bent over a mandrel through the arc of a circle having a twelve inch radius, first with the uncoated surface of the panel adjacent the mandrel, then with the coated surface of the panel next to the mandrel and then again with the uncoated surface of the panel next to the mandrel. Flexibility was determined by the presence or absence of cracks in the coating while the panel was maintained in a bent position and adhesion was observed as the presence or absence of delamination of such coating from the panel surface, while the coated panel was maintained in a bent position.

The durability of the cement coatings was determined as a measure of the resistance of such coating to delamination from black iron or galvanized iron metal panels when the coated panels were subjected to alternate freezing and thawing. More particularly, each coated sample, after curing, was first frozen in air at about 0° F. and then allowed to thaw in water at about 70° F. for a total of ten such cycles, and inspected for the presence of delamination. The samples surviving such exposure were then alternately frozen in water at 0° F. and allowed to thaw in water, for an additional ten cycles and again inspected for delamination. Finally those samples found to be free of delamination were alternately frozen in a 10 percent aqueous NaCl solution at 0° F. and allowed to thaw in a similar solution at 70° F. for ten more cycles.

The sprayability of the cement coating compositions described herein was determined by application of such coatings to the interior and exterior surfaces of galvanized or black corrugated iron pipe and/or smooth panels, utilizing a "Quick Spray" hopper gun having a medium fluid nozzle (⁷⁄₃₂ of an inch) and an air orifice of about ⁵⁄₃₂ of an inch. Optimum air pressure employed ranged from about 8 to 12 p.s.i. Coatings having a total thickness of about ⅛ of an inch as obtained by deposition of two coatings each having a thickness of about ¹⁄₁₆ of an

TABLE III

|  | Product of Example | Comparative Product "B" |
| --- | --- | --- |
| Flexibility: | | |
| (a) Galvanized iron panels | No cracks | Cracks. |
| (b) Black iron panels | do | Do. |
| Adhesion: | | |
| (a) Galvanized iron panels | No delamination | No delamination. |
| (b) Black iron panels | do | Delamination. |
| Durability (freeze-thaw resistance): (a) galvanized iron panels. | Passed all tests | Failed first ten cycles. |
| Sprayability: | | |
| (a) Corrugated galvanized iron pipe | Readily sprayable, forms smooth, continuous coating which does not shrink during curing. | Readily sprayable, forms smooth slightly discontinuous coating with noticeable shrinkage during curing. |
| (b) Corrugated black iron pipe | do | Do. |
| (c) Portland cement pipe | do | Do. | inch were produced. In general, a mix having a flow of about 100 percent at 15 drops of the flow table (ASTM C-255-52 part 9, 1964) is required for optimum sprayability.

Similar good results as described and specifically illustrated herein are obtained utilizing the compositions and methods as defined by the present invention.

What is claimed is:

1. A cement mortar coating composition comprising a mixture of: Portland cement, from about 200 to 400 percent based on the weight of said cement of a mineral aggregate having an average particle size of from about 75 to 250 microns, from about 3 percent to about 20 percent based on the weight of said cement of an asbestos fiber filler, from about 20 to about 40 percent based on the weight of said cement of a sytrene-butadiene-1,3 copolymer having a styrene to butadiene weight ratio of about 30:70 to 70:30, water in amount of from about 45 to about 65 percent based on the weight of said cement and based on the weight of said copolymer, (a) from about 2 to about 10 percent of non-ionic surfactant, (b) from about 1 to about 7.5 percent of anionic surfactant, at least about 15 percent of which is a sodium alkyl sulfate in which the alkyl group contains 9 to 17 carbon atoms, and (c) from about 0.25 to about 0.8 percent of a polyorganosiloxane foam depressant, the sum of (a) and (b) not exceeding about 11 percent by weight of said copolymer and weight ratio of (a) to (b) being within the range of about 0.7:1 to 10:1.

2. The cement composition of claim 1 wherein said asbestos fiber filler has a length of less than about 1000 microns.

3. The cement mortar composition of claim 2 wherein the non-ionic surfactant is di-t-butylphenoxynonaoxyethyleneethanol, the anionic sufactant comprises a mixture of an alkyl aryl sulfonate and a sodium alkyl sulfate, at least 15 percent of said anionic surfactant being an alkylsodium sulfate in which the alkyl group contains 9 to 17 carbon atoms, and the polyorganosiloxane foam depressant is polymethylsiloxane.

4. The composition of claim 3 wherein said alkyl, aryl sulfonate is dodecylbenzene sodium sulfonate and said alkyl sodium sulfate is sodium lauryl sulfate.

5. The composition of claim 4 wherein said copolymer is a copolymer of about 66 percent styrene and about 34 percent butadiene.

6. A method of protecting solid surfaces which comprises (1) depositing thereon at least one continuous coating comprising a mixture of: Portland cement, from about 200 to 400 percent based on the weight of said cement of a mineral aggregate having a particle size of from about 75 to 250 microns, from about 3 percent to about 20 percent based on the weight of said cement of a styrene-butadiene-1,3 copolymer having a styrene to butadiene weight ratio of about 30:70 to 70:30, water in amount of at least about 45 percent based on the weight of said cement and, based on the weight of said copolymer, (a) from about 2 to about 10 percent of non-ionic surfactant (b) from about 1 to about 7.5 percent of anionic surfactant, at least about 15 percent of which is a sodium alkyl sulfate in which the alkyl group contains 9 to 17 carbon atoms, and (c) from about 0.25 to about 0.8 percent of a polyorganosiloxane foam depressant, the sum of (a) and (b) not exceeding about 11 percent by weight of said copolymer and weight ratio of (a) to (b) being within the range of about 0.7:1 to 10:1, and (2) curing said coating.

7. The method of claim 6 wherein said coating is sprayed onto said surface prior to curing of the same.

8. The method of claim 7 wherein said coating has a thickness of about ⅛ of an inch or less after curing.

9. The method of claim 6 wherein said solid surface is galvanized iron.

10. The method of claim 6 wherein said solid surface is concrete.

11. A solid article having at least one major surface coated with at least one continuous, cured, protective coating wherein said coating is prepared by intimately mixing: Portland cement, from about 200 to 400 percent based on the weight of said cement of a mineral aggregate having a particle size of from about 75 to 250 microns, from about 3 percent to about 20 percent based on the weight of said cement of an asbestos fiber filler, from about 20 to about 40 percent based on the weight of said cement of a styrene-butadiene-1,3 copolymer having a styrene to butadiene weight ratio of about 30:70 to 70:30, water in amount of at least about 45 percent based on the weight of said cement and, based on the weight of said copolymer, (a) from about 2 to about 10 percent of nonionic surfactant, (b) from about 1 to about 7.5 percent of anionic surfactant, at least about 15 percent of which is a sodium alkyl sulfate in which the alkyl group contains 9–17 carbon atoms, and (c) from about 0.25 to about 0.8 percent of a polyorganosiloxane fluid foam depressant, the sum of (a) and (b) not exceeding about 11 percent by weight of said copolymer and the weight ratio of (a) to (b) being within the range of about 0.7:1 to 10:1.

12. The article of claim 11 wherein said article is a corrugated metal pipe.

13. The article of claim 12 wherein said article is a Portland cement concrete pipe.

References Cited

UNITED STATES PATENTS

| | | | |
|---|---|---|---|
| 2,662,064 | 12/1953 | Mead | 260—29.7 |
| 2,769,713 | 11/1956 | Wilson | 260—29.7 |
| 2,850,535 | 9/1958 | Lane | 260—613 |
| 3,043,790 | 7/1962 | Sanders | 260—29.7 |

SAMUEL H. BLECH, *Primary Examiner.*

MURRAY TILLMAN, *Examiner.*

J. ZIEGLER, J. T. GOOLKASIAN,
*Assistant Examiners.*